United States Patent Office 3,435,698
Patented Apr. 1, 1969

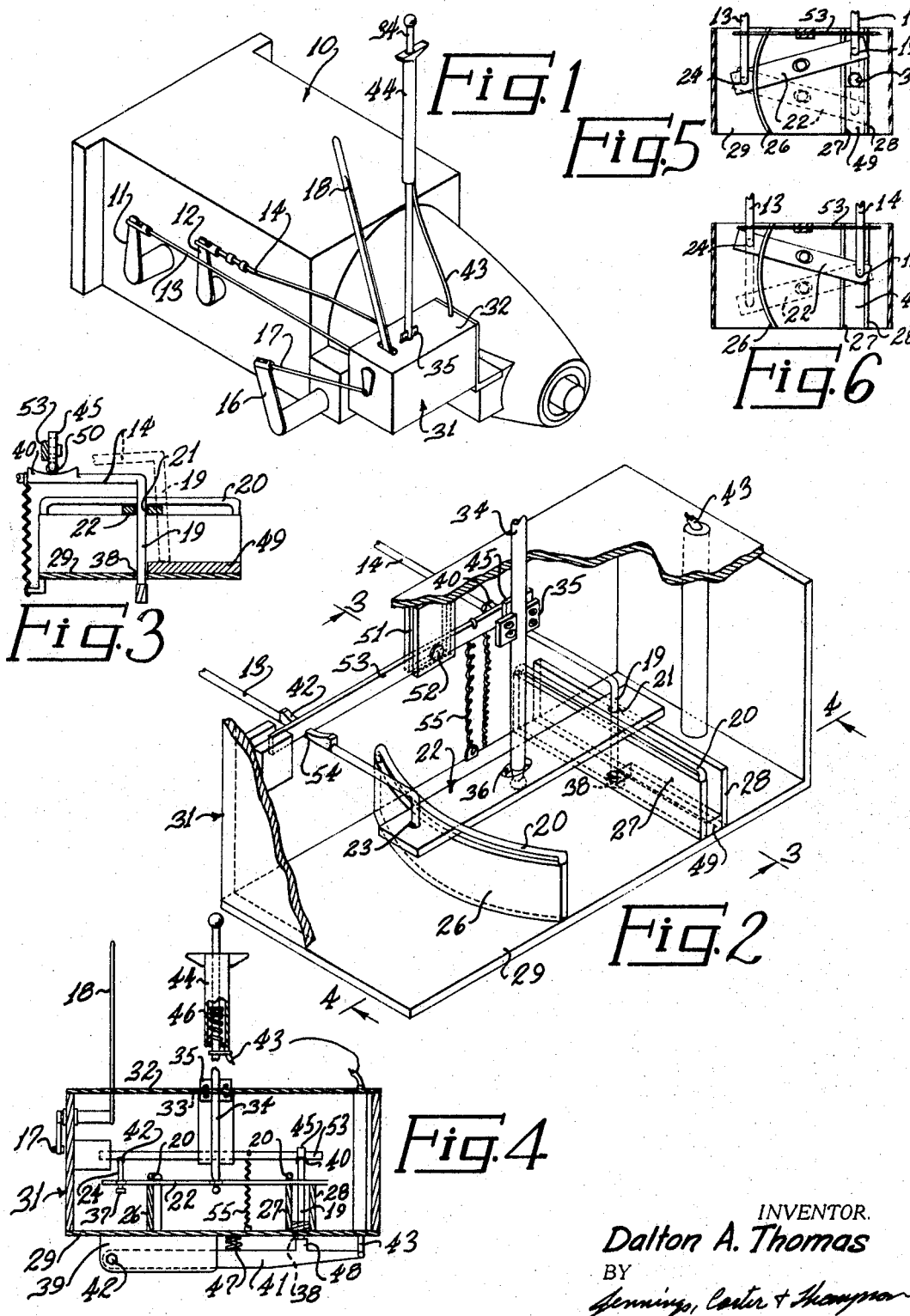

3,435,698
GEAR SHIFT MECHANISM
Dalton A. Thomas, Rte. 1, Box 97, Alpine, Ala. 35014
Filed Aug. 21, 1967, Ser. No. 661,858
Int. Cl. G05g 9/00
U.S. Cl. 74—477          10 Claims

ABSTRACT OF THE DISCLOSURE

Shifting apparatus for transmission actuating members pivoted to the ends of a bar with a shift lever connected to an intermediate portion of the bar. A lateral projection carried by one actuating member is engaged by a first restraining element upon relative movement thereof and said first restraining element in one direction to hold said one actuating member against longitudinal movement. A second restraining element operates in response to said relative movement in said one direction to release said other actuating member and in response to said relative movement in another direction to hold the other actuating member against longitudinal movement.

BACKGROUND OF THE INVENTION

Heretofore in the art to which my invention relates, difficulties have been encountered in changing gears of an automotive vehicle quickly and smoothly whereby there is a considerable loss of power as the transmission is placed in different drive settings. While apparatus has been proposed for shifting gears by straight line motion of the gear shift lever, it has been necessary to actuate other mechanism in order to lock one actuating member in place while the other actuating member is moved to a different drive setting.

BRIEF SUMMARY OF THE INVENTION

In accordance with my invention, the transmission may be placed in different drive settings by straight line motion of the gear shift lever without the necessity of actuating other locking mechanism each time the transmission is placed in a different drive setting. A lateral projection is carried by one of the actuating members for the transmission and is pivotally connected to one end of an elongated member with the projection extending outwardly thereof. The other actuating member is connected to the opposite end of the elongated member and a gear shift lever is operatively connected to the elongated member intermediate the actuating members. A first releasable restraining element is adapted to engage the outwardly extending projection in response to relative movement between the projection and the restraining element in one direction to hold said one actuating member against longitudinal movement and permit longitudinal movement of said one actuating member in response to relative movement of the projection and the restraining element in another direction. A second releasable restraining element is operable in response to relative movement of the first restraining element and the projection in said one direction to release the other actuating member for longitudinal movement and is operable in response to relative movement in said another direction to hold said other actuating member against longitudinal movement.

Apparatus embodying features of my invention is illustrated in the accompanying drawing, forming a part of this application, in which:

FIG. 1 is a perspective view showing an automotive transmission unit having my improved apparatus associated therewith;

FIG. 2 is an enlarged, fragmental view showing the gear shift mechanism;

FIG. 3 is a sectional view taken generally along the line 3—3 of FIG. 2;

FIG. 4 is a sectional view taken generally along the line 4—4 of FIG. 2, partly broken away and in section;

FIG. 5 is a fragmental plan view, partly in section, showing two of the drive settings of the apparatus; and, FIG. 6 is a fragmental plan view, partly in section, showing two other drive settings of the apparatus.

Referring now to the drawing for a better understanding of my invention, I show an automotive transmission generally at 10 which is provided with the usual actuating arms 11 and 12 which are connected to actuating members 13 and 14, respectively. While I have shown the transmission 10 as being a conventional type four speed transmission having a separate operating arm 16 for placing the transmission in a reverse drive setting, it will be apparent that the apparatus is also adapted for use with a three speed transmission. The operating arm 16 is connected by a link 17 to a shift lever 18 whereby the transmission may be placed in reverse. When my invention is used with a three speed transmission the reverse mechanism just described is not necessary. The apparatus just described is conventional type mechanism for placing the transmission in different drive settings.

My improved apparatus for operating the actuating members 13 and 14 will now be described. A depending, lateral projection 19 is carried by the free end of the actuating member 14 in position to extend through an opening 21 proided adjacent one end of an elongated member 22. An opening 23 is provided adjacent the other end of the elongated member 22 for receiving a depending, lateral projection 24 carried by the free end of actuating member 13. As shown in FIGS. 2 and 4, the elongated member 22 is mounted for sliding movement on subjacent, vertical guide members 26, 27 and 28 which are carried by a plate-like member 29 which forms the bottom wall of a housing 31. Member 22 is held in place on the guide members by means of rods or the like 20 secured to and spaced from the guide members.

The top of the housing 31, indicated at 32, is provided with an opening 33 therethrough for receiving a gear shift lever 34. A suitable pivot unit 35 is provided between shift lever 34 and the top 32 of housing 31 whereby the shift lever may be pivoted relative to the top 32. An opening 36 is provided in member 22 intermediate the openings 21 and 23 for receiving the lower end of the gear shift lever 34 whereby the gear shift lever 34 is adapted to move the elongated bar member 22 longitudinally of the subjacent guide members 26, 27 and 28. A suitable stop member 37 is carried by the lower end of the lateral projection 24 carried by the actuating member 13 to prevent separation of the projection from the elongated bar 22.

As shown in FIGS. 2 and 3, the plate-like bottom wall 29 of the housing 31 is provided with an opening 38 therethrough for receiving the lower end of the projection 19 whereby the adjacent end of the elongated member 22 is adapted to pivot about the projection 19 so long as the projection 19 extends inwardly of opening 38. That is, opening 38 prevents longitudinal movement of the actuating member 14 to oppositely disposed drive settings.

Secured to and extending beneath the bottom wall 29 is a support bracket 39 which is pivotally connected to an arm 41 by a pivot pin 42. The free end of the arm 41 is connected to the lower end of a flexible actuating cable 43 which in turn in connected to an operating member 44 which is adapted for longitudinal movement along the gear shift lever 34. The operating member 44 is urged downwardly by a compression spring 46. Also, a compression spring 47 is interposed between the arm 41 and the bottom wall 29 to urge the free end of the arm 41 downwardly away from the bottom wall 29. An upstanding plunger 48 is carried by the arm 41 in position to enter the opening 38 and force the projection 19 upwardly out of engagement with opening 38. An elevated support member 49 is mounted on the bottom wall 29, as shown in FIG. 3 in position to receive the lower end of the depending projection 19 when it is moved to the elevation indicated in dotted lines in FIG. 3.

Pivotally connected to a vertical support bracket 51 by a pivot pin 52 is an elongated arm 53 which is adapted to extend across the actuating members 13 and 14, as shown in FIGS. 2 and 3. The arm 53 is provided with a vertically adjustable bracket 45 which carries a roller 50. The roller 50 engages the actuating member 14 and a suitable notch 54 is provided in the actuating member 13 in position to receive the arm 53 while the transmission is in neutral position. That is, while the transmission is in neutral position, the actuating members 13 and 14 are so positioned that the notch 54 receives the adjacent portion of arm 53 and the depending projection 19 carried by actuating member 14 engages the opening 38. Preferably a saddle-like member 40, having an upper arcuate surface, is mounted adjacent one end of arm 53 in position to receive roller 50. Also, a similar saddle-like member 42 is provided at the other end of arm 53, the notch 54 being adjacent the lowermost portion thereof.

From the foregoing description, the operation of my improved gear shift mechanism will be readily understood. To move the transmission to a drive setting corresponding to first gear, the operating member 44 is elevated, thus moving plunger 48 into opening 38 whereby the projection 19 is moved upwardly to the elevation shown in dotted lines in FIG. 3. The gear shift lever 34 is then moved in a straight line forward whereby the elongated member 22 moves to the dotted line position shown in FIG. 5. The engagement of the arm 53 in notch 54 restrains longitudinal movement of actuating member 13 as the actuating member 14 is thus moved forward to first gear, as shown in dotted lines in FIGS. 3 and 5.

To place the transmission in a second drive setting, the operating member 44 is released and the gear shift lever 34 is pulled rearwardly in a straight line to the solid line position shown in FIG. 5. The pressure of the elongated member 22 against the depending projection 19 prevents member 19 from entering the opening 38 whereby the projection 19 passes over opening 38 and slides along the bottom wall 29 to the second gear setting. It will be noted that as the elongated member 22 is moved to the first and second drive settings, shown in FIG. 5, the elongated member 22 pivots about the depending end 24 of actuating member 13.

To move the transmission to the third gear drive setting, the gear shift lever 34 is moved forward whereupon the depending projection 19 engages the end of the elevated support member 49, thus aligning the projection 19 with the subjacent opening 38. The projection 19 then falls into opening 38 due to the fact that spring 47 has urged the plunger 48 outwardly of the opening 38. As the depending projection 19 carried by the actuating member 14 falls into the opening 38, the adjacent end of arm 53 is lowered whereupon the other end of arm 53 is moved outwardly of the notch 54, thus freeing the actuating member 13 for longitudinal movement. A tension spring 55 is interposed between the plate 29 and the end of the arm 53 projecting outwardly over actuating member 14 to urge the arm 53 out of engagement with notch 54 as projection 19 enters opening 38. Continued forward movement of the gear shift lever 34 causes the elongated bar 22 to pivot about the projection 19 whereupon the elongated member 22 and actuating member 13 moves to the dotted line position shown in FIG. 6.

To move the transmission to the fourth gear drive setting, the gear shift lever 34 is pulled in a straight line rearwardly whereby the elongated member 22 and the actuating member 13 move to the solid line position shown in FIG. 6. It will be noted that as the elongated member 22 is moved to the third and fourth gear settings, it pivots about the depending projection 19.

From the foregoing, it will be seen that I have devised an improved gear shift mechanism for automotive vehicles. By providing gear shift mechanism which moves in a straight line direction as the gear drive settings are changed, I eliminate entirely the possibility of the gears becoming misaligned relative to each other due to the holding action of the depending member 19 in opening 38 and the holding action of the engagement of arm 53 with notch 54, as the case may be. Since operating member 44 is only lifted as the gear shift lever is moved to first gear setting as shown in dotted lines in FIG. 5, the operating member 44 is released immediately upon placing the gear in the first drive setting whereupon it is not necessary to touch operating member 44 during the shifting of the mechanism to the other gear settings. By providing a positive holding action between the depending projection 19 and the opening 21 in the elongated member 22, the projection 19 is held in the raised position, as shown in dotted lines in FIG. 3 until the projection 19 passes over and across the opening 38 and then slides along the plate-like bottom wall 29 to the second gear position shown in solid lines in FIG. 5. By providing mechanism for changing the drive settings of the transmission without having to actuate auxiliary levers or the like, the gear shift lever 34 is moved in straight line forward and rearward directions to change the drive settings in a minimum of time and with a minimum of effort.

While I have shown the apparatus as being adapted for use with a four speed transmission, it will be apparent that the apparatus will also be adapted for use with a three speed transmission wherein the reverse position would correspond to the dotted line position of elongated member 22 shown in FIGS. 3 and 5. That is, instead of placing the transmission in the first drive setting as the projection 19 is moved to the elevated, dotted line position shown in FIG. 3, the transmission would be in reverse gear at this point.

While I have shown my invention in but one form, it will be obvious to those skilled in the art that it is not so limited, but is susceptible of various other changes and modifications without departing from the spirit thereof.

What I claim is:

1. In an automotive transmission having two actuating members operatively connected thereto with each being shiftable longitudinally from an intermediate position corresponding to a neutral setting to either of two oppositely disposed positions respectively placing the transmission in different drive settings, means for shifting said actuating members comprising:

(a) a lateral projection carried by one of said actuating members,
 (b) an elongated member pivotally connected adjacent one end thereof to said projection with said projection extending outwardly thereof,
 (c) means pivotally connecting the other end of said elongated member to the other of said actuating members,
 (d) a shift lever operatively connected to said elongated member intermediate the pivotal connections of said elongated member to said actuating members,
 (e) a first releasable restraining element disposed to engage the lateral projection of said one actuating member,
 (f) means to impart relative movement between said projection and said first restraining element in one direction to hold said one actuating member against longitudinal movement and in another direction to permit longitudinal movement of said one actuating member to said oppositely disposed positions, and
 (g) a second releasable restraining element operable in response to relative movement of said first restraining element and said projection in said one direction to release said other actuating member for longitudinal movement to said oppositely disposed positions and operable in response to relative movement of said first restraining element and said projection in said another direction to hold said other actuating member against longitudinal movement.

2. The combination defined in claim 1 in which both of said actuating members have depending lateral projections and openings are provided adjacent opposite ends of said elongated member for receiving said projections.

3. The combination defined in claim 1 in which said elongated member is supported for sliding movement on subjacent guide members extending transversely beneath said elongated member.

4. The combination defined in claim 1 in which said first releasable restraining element comprises a transverse plate-like member mounted adjacent the end of said lateral projection and having an opening therethrough in position to receive said projection upon relative movement of said projection and said plate-like member in said one direction and disposed to release said projection upon relative movement of said projection and said plate-like member in said another direction.

5. The combination defined in claim 4 in which said projection is adapted for movement relative to said plate-like member and said means to impart relative movement including a movable plunger mounted at the opposite side of said plate-like member from said one actuating member in position to engage and move said projection outwardly of said opening.

6. The combination defined in claim 5 in which said plunger is carried by an arm mounted for pivotal movement toward and away from said plate-like member and an operating member is connected to said arm for moving said arm relative to said plate-like member.

7. The combination defined in claim 6 in which a spring member is interposed between said arm and said plate-like member and urges said arm away from said plate-like member.

8. The combination defined in claim 4 in which an elevated support member is carried by said plate-like member at the side of said opening opposite said one actuating member in position to support said lateral projection upon movement thereof to a predetermined distance above said opening so that said projection rides on said elevated support as it moves to one drive setting.

9. The combination defined in claim 1 in which said second releasable restraining element comprises:
(a) an operating arm mounted for pivotal movement intermediate its ends with one end thereof slideably engaging said one actuating member so that said operating arm moves about its pivot point in response to relative movement of said projection and said first restraining element, and
(b) cooperating locking elements carried by the other end of said operating arm and said other actuating member disposed to engage each other and hold said other actuating member against longitudinal movement in response to relative movement of said projection and said first restraining element in said another direction and disposed to release each other and permit longitudinal movement of said other actuating member in response to relative movement of said projection and said first restraining element in said one direction.

10. The combination defined in claim 9 in which said cooperating locking elements comprise a notch in said other actuating member disposed to receive said other end of said operating arm.

References Cited
UNITED STATES PATENTS 2,265,378  12/1941  Lawler _____ 74—477
3,264,894  8/1966   Popovich et al. _____ 74—477

MILTON KAUFMAN, *Primary Examiner.*